United States Patent [19]
Hawkins et al.

[11] Patent Number: 6,070,203
[45] Date of Patent: *May 30, 2000

[54] CIRCUIT FOR GENERATING ALMOST FULL AND ALMOST EMPTY FLAGS IN RESPONSE TO SUM AND CARRY OUTPUTS IN ASYNCHRONOUS AND SYNCHRONOUS FIFOS

[75] Inventors: Andrew L. Hawkins; Pidugu L. Narayana, both of Starkville, Miss.

[73] Assignee: Cypress Semiconductor Corp., San Jose, Calif.

[*] Notice: This patent is subject to a terminal disclaimer.

[21] Appl. No.: 09/201,413

[22] Filed: Nov. 30, 1998

Related U.S. Application Data

[63] Continuation of application No. 08/577,712, Dec. 22, 1995, Pat. No. 5,850,568.

[51] Int. Cl.⁷ .................................................. G06F 13/14
[52] U.S. Cl. .................. 710/57; 710/52; 365/189.07; 365/236
[58] Field of Search .................. 340/146.2; 365/189.07, 365/236, 49; 710/57, 56, 55, 54, 53, 52; 370/412

[56] References Cited

U.S. PATENT DOCUMENTS

| | | | |
|---|---|---|---|
| 4,467,443 | 8/1984 | Shima | 395/416 |
| 4,802,122 | 1/1989 | Auvinen et al. | 365/154 |
| 4,833,651 | 5/1989 | Seltzer et al. | 365/189.07 |
| 4,847,812 | 7/1989 | Lodhi | 365/221 |
| 4,864,543 | 9/1989 | Ward et al. | 365/221 |
| 4,888,739 | 12/1989 | Frederick et al. | 365/211 |
| 4,891,788 | 1/1990 | Kreifels | 365/49 |
| 4,942,553 | 7/1990 | Dalrymple et al. | 364/900 |
| 5,021,994 | 6/1991 | Tai et al. | 364/900 |
| 5,079,693 | 1/1992 | Miller | 395/250 |
| 5,088,061 | 2/1992 | Golnabi et al. | 365/189.01 |
| 5,121,346 | 6/1992 | McClure | 364/550 |
| 5,222,047 | 6/1993 | Matsuda et al. | 365/230.03 |
| 5,228,002 | 7/1993 | Huang | 365/221 |

(List continued on next page.)

FOREIGN PATENT DOCUMENTS

| | | |
|---|---|---|
| 0113996 | 8/1989 | Japan . |
| 0676559 | 6/1994 | Japan . |

OTHER PUBLICATIONS

Andrew Hawkins et al., U.S.S.N. 08/567,893 State Machine Design for Generating Empty and Full Flags in an Asynchronous FIFO, filed Dec. 6, 1995.

Andrew Hawkins et al., U.S.S.N. 08/567,918 State Machine Design for Generating Half–Full and Half–Empty Flags in an Asynchronous FIFO, filed Dec. 6, 1995.

(List continued on next page.)

*Primary Examiner*—Thomas C. Lee
*Assistant Examiner*—Harold Kim
*Attorney, Agent, or Firm*—Christopher P. Maiorana, P.C.

[57] ABSTRACT

An efficient design to generate a programmable almost empty or programmable almost full flags. The present invention accomplishes this by efficiently evaluating the read count minus write count plus a user programmed offset being greater than or equal to zero for the programmable almost empty flag generation. Similarly, evaluating write count minus the read count plus the user programmed offset minus the size of the FIFO is greater than or equal to zero for the programmable almost full flag generation. The counters in the FIFO count from 0 to twice the size of the FIFO minus one and the user programmed offset can be between 0 to the size of the FIFO minus one. The offset has one less bit than the read and write counters. The processing block masks out the higher order bits of the Offset input based on the size of the FIFO. The first stage performs the bit wise addition of the offset, read counter and write counter inputs without any carry chain propagation. From the sum and carry outputs of the first stage bitwise addition, bits with equal weights are united and the overall carry out of this addition is generated very efficiency. The overall carry represents the external almost empty or almost full flag.

16 Claims, 7 Drawing Sheets

U.S. PATENT DOCUMENTS

| | | | |
|---|---|---|---|
| 5,262,996 | 11/1993 | Shiue | 362/221 |
| 5,265,063 | 11/1993 | Kogure | 365/233 |
| 5,274,600 | 12/1993 | Ward et al. | 365/221 |
| 5,278,956 | 1/1994 | Thomsen et al. | 395/250 |
| 5,311,475 | 5/1994 | Huang | 365/221 |
| 5,315,184 | 5/1994 | Benhamida | 307/518 |
| 5,325,487 | 6/1994 | Au et al. | 395/250 |
| 5,336,938 | 8/1994 | Sywyk | 307/265 |
| 5,345,419 | 9/1994 | Fenstermaker et al. | 365/189.04 |
| 5,367,486 | 11/1994 | Mori et al. | 365/189.05 |
| 5,381,126 | 1/1995 | McClure | 340/146.2 |
| 5,384,744 | 1/1995 | Lee | 365/221 |
| 5,404,332 | 4/1995 | Sato et al. | 365/201 |
| 5,406,554 | 4/1995 | Parry | 370/58.1 |
| 5,412,611 | 5/1995 | Hattori et al. | 365/221 |
| 5,426,612 | 6/1995 | Ichige et al. | 365/220 |
| 5,467,319 | 11/1995 | Nusinov et al. | 365/231 |
| 5,471,583 | 11/1995 | Au et al. | 395/250 |
| 5,473,756 | 12/1995 | Traylor | 710/57 |
| 5,487,049 | 1/1996 | Hang | 365/221 |
| 5,490,257 | 2/1996 | Hoberman et al. | 395/427 |
| 5,495,451 | 2/1996 | Cho | 365/221 |
| 5,502,655 | 3/1996 | McClure | 364/550 |
| 5,506,809 | 4/1996 | Csoppenszky et al. | 365/221 |
| 5,506,815 | 4/1996 | Hsieh et al. | 365/230.03 |
| 5,508,679 | 4/1996 | McClure | 340/146.2 |
| 5,515,330 | 5/1996 | Hattori et al. | 365/221 |
| 5,519,701 | 5/1996 | Colmant et al. | 370/412 |
| 5,546,347 | 8/1996 | Ko et al. | 365/221 |
| 5,557,575 | 9/1996 | Lee | 365/221 |
| 5,587,962 | 12/1996 | Hashimoto et al. | 365/230.09 |
| 5,619,681 | 4/1997 | Benhamida et al. | 395/500 |
| 5,623,449 | 4/1997 | Fischer et al. | 315/200 |
| 5,625,842 | 4/1997 | Dalrymple | 395/842 |
| 5,627,797 | 5/1997 | Hawkins et al. | 365/221 |
| 5,636,176 | 6/1997 | Hashimoto et al. | 365/233 |
| 5,661,418 | 8/1997 | Narayana et al. | 326/105 |

OTHER PUBLICATIONS

Andrew Hawkins et al., U.S.S.N. 08/666,751 Half–Full Flag Generator for Synchronous FIFOS, filed Jun. 19, 1996.

Pidugu Narayana et al., U.S.S.N. 08/666,751 Half–Full Flag Generator for Synchronous FIFOS, filed Jun. 19, 1996.

P. Forstner, FIFOs With a Word Width of One Bit, First–In, First–Out Technology, Mar. 1996, pp. 1–24.

T. Jackson, FIFO Memories: Solution to Reduce FIFO Metastability, First–In, First–Out Technology, Mar. 1996, pp. 1–6.

T. Jackson, Advanced Bus–Matching/Byte–Swapping Features for Internetworking FIFO Applications, Mar. 1996, pp. 1–3, 5–12.

T. Jackson, Parity–Generate and Parity–Check Features for High–Bandwidth–Computing FIFO Applications, Mar. 1996, pp. 1–3, 5–8.

T. Ishii et al., High–Speed, High–Drive SN74ABT7819 FIFO, Mar. 1996, pp. 1–3, 5–12.

C. Wellheuser et al., Internetworking the SN74ABT3614, Mar. 1996, pp. 1–21.

C. Wellheuser, Metastability Performance of Clocked FIFOs, 1996, pp. 1–3, 5–12.

High Speed CMOS 256 x 36x 2 Bi–direction FIFO, QS725420A, MDSF–00018–01, Apr. 24, 1995, pp. 1–36.

High–Speed CMOS 4K x 9 Clocked FIFO with Output Enable, QS7244A, MDSF–00008–05, Jun. 6, 1995, pp. 1–12.

High–Speed CMOS 1K X 36 Clocked FIFO with Bus Sizing, QS723620, MDSF–00020–00, Jul. 17, 1995, pp. 1–36.

Cypress Preliminary CY7C4 425/4205/4215/ CY7C4225/4235/4245 64, 256,512, 1K, 2K,4K x 18 Synchronous FIFOS, pp. 5–67–5–82.

CIRCUIT FOR GENERATING ALMOST FULL AND ALMOST EMPTY FLAGS IN RESPONSE TO SUM AND CARRY OUTPUTS IN ASYNCHRONOUS AND SYNCHRONOUS FIFOS

This is a continuation of U.S. patent application Ser. No. 08/577,712, filed on Dec. 22, 1995, issued as U.S. Pat. No. 5,850,568 on Dec. 15, 1998.

FIELD OF THE INVENTION

This invention relates to FIFO buffers generally and more particularly to a circuit for generating almost full and almost empty flags in both asynchronous and synchronous FIFO buffers.

BACKGROUND OF THE INVENTION

It is well known to construct a first-in first-out (FIFO) buffer using counters, adders and combinatorial logic to generate an almost empty and/or an almost full flag. It is also well known to generate the almost empty and almost full flags having a user programmed offset ahead of the respective boundary flags. Typically the almost empty and almost full flags are generated by computing the difference between the write and read counters and comparing this magnitude with the user programmed offset. The read and write counters are reset to zero upon master reset.

In a typical adder/comparator technique, there are two counters one each for the read and write clocks. These two counters are reset to zero upon a master reset and incremented based only on their respective clocks. The outputs of the read and write counters are fed into an adder that calculates the difference between the read and write counters and the magnitude of this difference is then compared with the user programmed offset. The output of the comparator represents the external almost empty flag in the case of asynchronous flags and is the output register data input in the case of synchronous flags. A similar adder comparator pair is used to generate the almost full flag. The main disadvantage with this technique is the long delays associated with generating the almost empty or almost full flag. Additionally, the silicon area requirements are very high because of the requirement of two adder-comparator pairs as well as the complexity of the magnitude comparator. The complexity of the magnitude comparator grows exponentially with the FIFO depth. Filters are typically required that increase the flag delay but are generally required to eliminate any logic hazards at the adder output.

The present invention overcomes the above drawbacks and demonstrates a way to generate almost empty and almost full flags with extremely short delays using minimal silicon area. Additionally, the same logic can be used to generate either the almost empty or the almost full flags. The circuit also provides uniform delay through all the paths and a glitch free output. Linear scalability is one of the added advantages with this invention.

SUMMARY OF THE INVENTION

The present invention provides an efficient design that can be used to generate a programmable almost empty or almost full flags. The present invention accomplishes this by efficiently evaluating the read count minus write count plus a user programmed offset that is greater than or equal to zero for the programmable almost empty flag generation. Similarly, evaluating write count minus the read count plus the user programmed offset minus the size of the FIFO that is greater than or equal to zero for the programmable almost full flag generation. The counters in the FIFO count from 0 to twice the size of the FIFO minus one and the user programmed offset can be between 0 and the size of the FIFO minus one. The offset has one less bit than the read and write counters.

The pre-processing block masks out the higher order bits of the Offset input based on the size of the FIFO. The first stage performs the bit wise addition of the offset, read counter and write counter inputs without any carry chain propagation. From the sum and carry outputs of the first stage bitwise addition, bits with equal weights are united and the overall carry out of this addition is generated very efficiency. The overall carry represents the external almost empty or almost full flag in the case of asynchronous flags and the output register data input in the case of synchronous flags.

DETAILED DESCRIPTION OF THE PREFERRED EMBODIMENT

Figure 1:
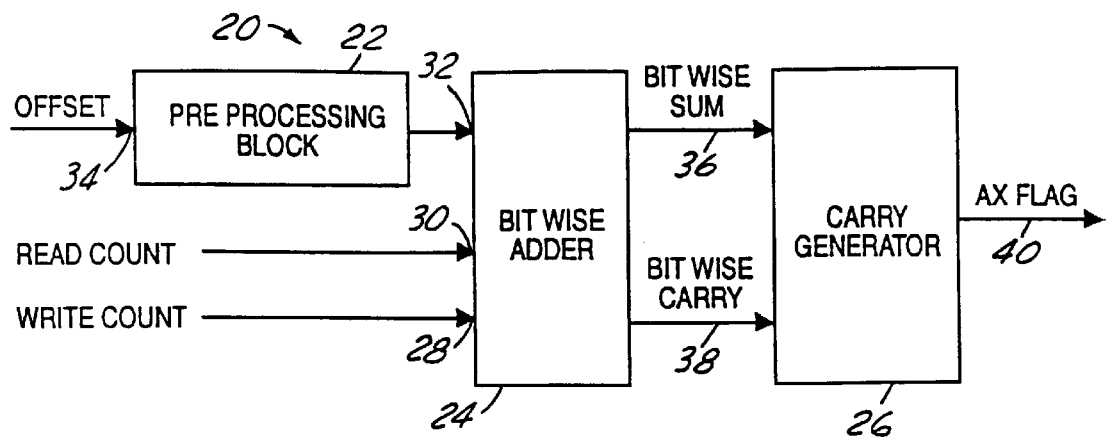
FIG. 1 is a block diagram of the overall architecture of the present invention.

Referring to FIG. 1, a flag generator 20 is shown. The flag generator 20 generally comprises a preprocessing block 22, a bitwise adder 24 and a carry generator 26. The bitwise adder 24 has a first input 28 that receives a write count signal, a second input 30 that receives a read count signal and a third input 32 that receives a signal from the preprocessing block 22. The read count and write count signals are counters that track the read and write clocks (not shown).

The preprocessing block 22 has an offset input 34 that receives an externally provided offset signal. The offset signal is a user programmable signal that is used to define the number of clock cycles, or words, that is desired as an offset when programming the flag generator 20. For example, if an offset of two clock cycles is implemented as the offset input 34, when the FIFO (not shown) is two cycles, or words, away from being full, in the case of an almost full flag, the output flag will be asserted. This allows the FIFO to appear to be full to an external device (not shown) while allowing enough memory to remain available in the FIFO to compensate for latent read or write activities. The number of clock cycles of the offset is defined by the design criteria of a particular application. The number and frequency of latent read and write activities will be factors in defining the size of the offset. It should be appreciated, that the programmable functioning of the offset input 34 can be implemented during chip manufacturing if only one offset is required. If the offset is set to zero, the output flag, in the case of an almost full flag, will act as a full flag. In the case of an almost empty flag, when the offset is set to zero, the output flag will act as an empty flag. Since any offset value can be programmed (between zero and the size of the FIFO minus one) nearly any status flag desired can be implemented. For example, if the offset is set to one half the size of the FIFO, a half-full flag would be generated. The preprocessing block 22 is described in more detail with respect to FIG. 4.

The bitwise adder 24 has an output 36 that represents a bitwise sum of the inputs 28, 30 and 32. The output 36 is presented to the carry generator 26. The bitwise adder 24 has a second output 38 that represents a bitwise carry. The second output 38 is presented to the carry generator 26. The carry generator 26 processes the bitwise sum and bitwise carry signals to produce an output 40 that represents an Ax flag. The Ax flag can either be an almost full flag, represented as Af, or an almost empty flag, represented as Ae. The nature of the Ax flag depends on the inputs presented to the bitwise adder 24.

Figure 2A:
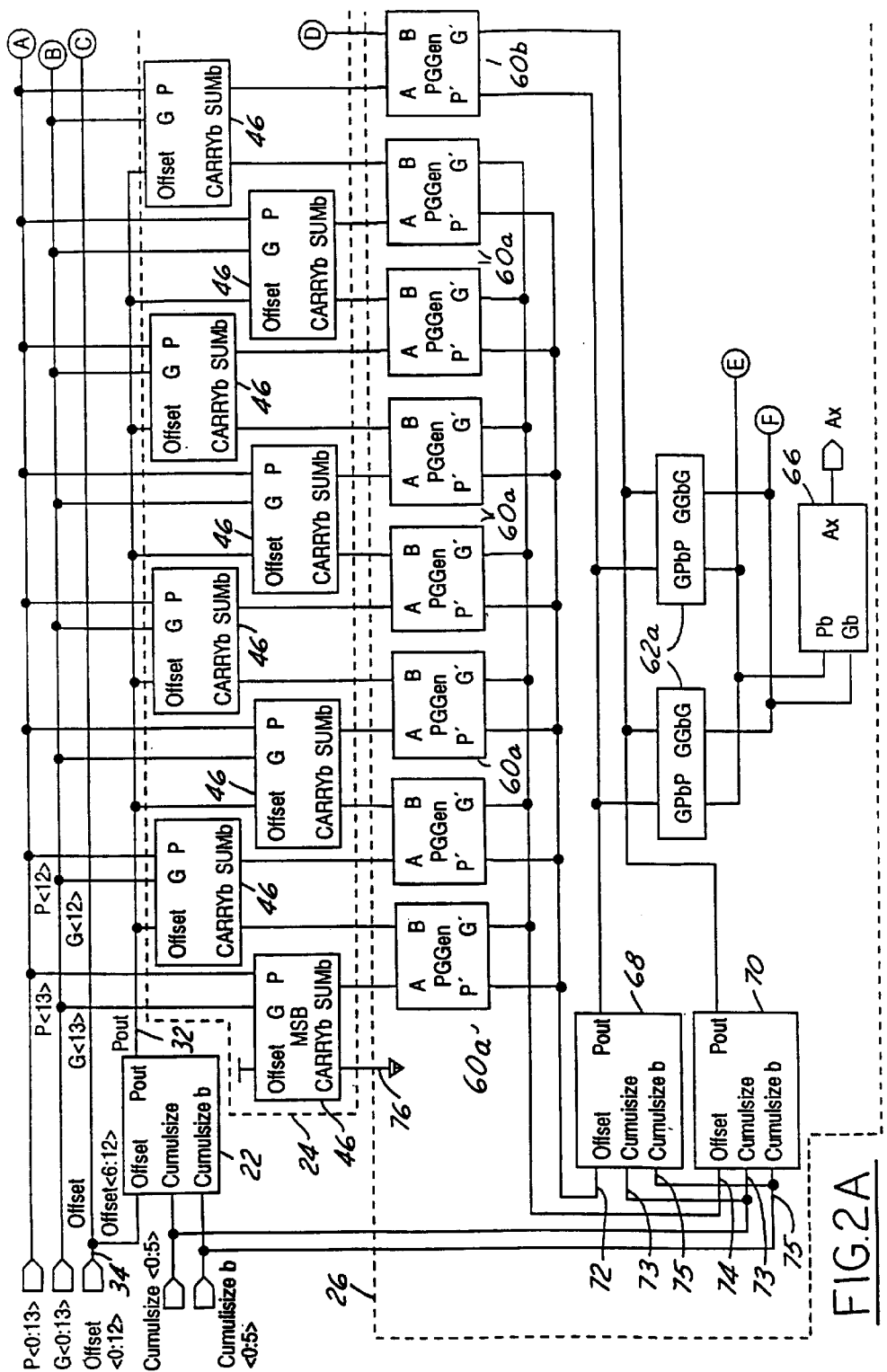
FIG. 2A and FIG. 2B form a more detailed block diagram of the present invention.
Figure 2B:
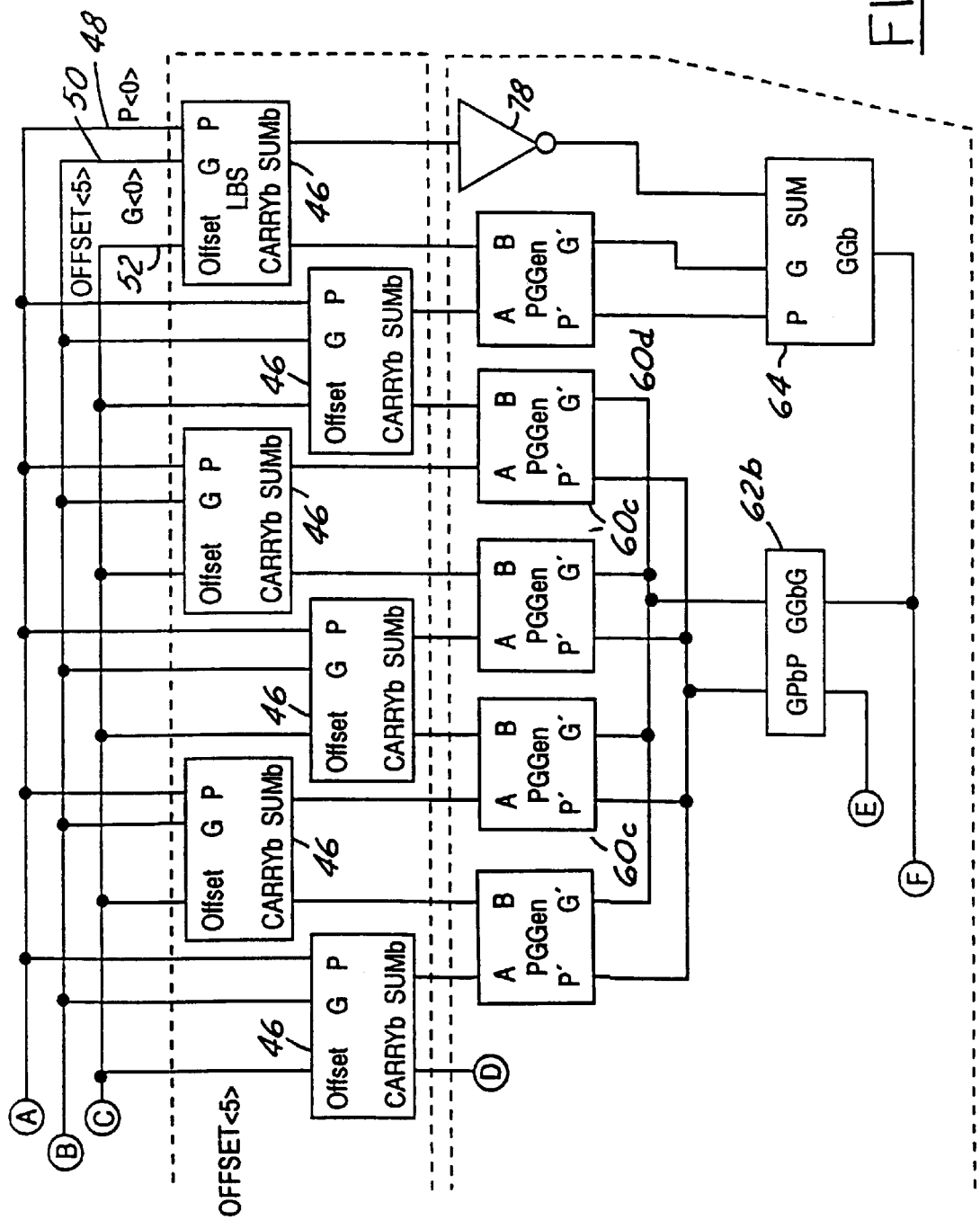

Referring to FIG. 2, a more detailed block diagram of the flag generator 20 is shown. The read count and write count signals are converted to a propagate signal P and a generate signal G through the use of a simple combinatorial logic (not shown) which is well known in the art. For example, the logic described in connection with FIG. 7 could be used here as well. The preprocessing block 22 is shown presenting an output Pout and receiving the offset input 34 as well as a cumulsize input 42 and a cumulsizeb input 44 representing control information used to determine the size of the FIFO. This control information is necessary when using the production technique of making a single size FIFO that is large enough to accommodate the design criteria of many applications. After production of the device, or during the last step of production of the device, the inputs 42 and 44 are used to disable portions of the FIFO that are not necessary. This technique reduces the overall cost of manufacturing the FIFO since a single FIFO die can be used to realize many different sizes of FIFOs. The notation <0:5> Indicates the particular input, for example the cumulsize input 42, is a 6-bit bus (i.e bits 0 thru 5). The notation <13> would indicate bit 13 of the particular bus, for example the 14-bit bus (i.e bits 0 thru 13) of the generate signal G. Similar notations are used for clarification throughout the drawings.

TABLE 1 describes the selection of the size of the FIFO as follows:

TABLE 1

|  | 8k | 4k | 2k | 1k | 512 | 256 | 64 |
|---|---|---|---|---|---|---|---|
| cumulsize<0> | 1 | 0 | 0 | 0 | 0 | 0 | 0 |
| cumulsize<1> | 1 | 1 | 0 | 0 | 0 | 0 | 0 |
| cumulsize<2> | 1 | 1 | 1 | 0 | 0 | 0 | 0 |
| cumulsize<3> | 1 | 1 | 1 | 1 | 0 | 0 | 0 |
| cumulsize<4> | 1 | 1 | 1 | 1 | 1 | 0 | 0 |
| cumulsize<5> | 1 | 1 | 1 | 1 | 1 | 1 | 0 |
| cumulsizeb<0> | 0 | 1 | 1 | 1 | 1 | 1 | 1 |
| cumulsizeb<1> | 0 | 0 | 1 | 1 | 1 | 1 | 1 |
| cumulsizeb<2> | 0 | 0 | 0 | 1 | 1 | 1 | 1 |
| cumulsizeb<3> | 0 | 0 | 0 | 0 | 1 | 1 | 1 |
| cumulsizeb<4> | 0 | 0 | 0 | 0 | 0 | 1 | 1 |
| cumulsizeb<5> | 0 | 0 | 0 | 0 | 0 | 0 | 1 |

The column headings, 8 k, 4 k, 2 k, 1 k, 512, 526 and 64, are examples of various sized FIFOs. The numbers inside the graph (i.e. 0 or 1) represent which portions of the FIFO are enabled. A 1 in the cumulsize matrix or a 0 in the cumulsizeb matrix indicates a particular bit in the flag architecture is disabled. A 0 in the cumulsizeb matrix indicates a particular bit in the flag architecture is enabled. It should be appreciated that the 1's in the grid are generally contiguous. A more detailed description of the physically enabling and disabling of certain memory cells is described in more detail with respect to FIG. 4 and FIG. 5.

The bitwise adder 24 is shown comprising fourteen individual carry/sum adders 46. Each of the carry/sum adders 46 receives a first input 48 from the propagate signal P and a second input 50 from the generate signal G. Several of the carry/sum adders 46 receive a third input 52 from the offset input 34. Several of the carry/sum adders 46 receive a third input 52 from the processing block 22. The CARRYb output from the first (MSB) carry/sum adder 46 is discarded. The carry/sum adders 46 that receive a third input 52 from the preprocessing block 22 can be disabled as described in connection with TABLE 1. The number of carry/sum adders that can be disabled and adjusted to fit the design requirements of a particular application. Each of the carry/sum adders 46 has a first output 54 that represents a SUMb signal and a second output 56 that represents a signal CARRYb. The signal SUMb and the signal CARRYb from each of the carry/sum adders 46, except for the CARRYb output 76 of the first carry/sum adder 46, are presented to the carry generator 26. The internal logic of each of the carry/sum adders 46 is described in more detail with respect to FIG. 6.

The carry generator 26 generally comprises a set of PG generators 60, a set of group PG generators 62, a group PG generatorLSB 64, a group control block 66, an offset block 68 and an offset block 70. The first seven PG generators 60a have propagate Poutputs that are presented to a first input 72 of the offset block 68. The first seven PG generators can be adjusted according to the requirements for disabling portions of the FIFO as described in connection with TABLE 1 and the carry/sum adders 46. Additionally, the first seven PG generators 60a have generate outputs Gthat are presented to the offset input 74 of the offset block 70. The eighth PG generator 60b has a propagate output Pthat is presented to the group PG generators 62a and a generate output Gthat is also presented to the group PG generators 62a. The propagate Pand generate Goutput of the 9th, 10th, 11th and 12th PG generators 60c are presented to the group PG generator 62b. The PG generator 62a and 62b each produce an output GPbP and an output GGbG. The propagate Pand generate G outputs of the 13th PG generator 60d are presented to the group PG generatorLSB block 64. Each of the PG generators 60 receives a first input A from a SUMb output of one of the carry/sum adders 46 and a second input B from a CARRYb output of an adjacent carry/sum adder 46. The CARRYb output 76 from the most significant bit carry/sum adder 46 is not connected to any other logic components. The SUMb output 54 of the least significant bit carry/sum adder 46 is presented to an inverter 78 that is then presented to the SUM input of the group PG generatorLSB block 64 to produce an output GGb.

The outputs GpbP and GGbG from the group PG generators 62a and 62b and the output GGb from the group PG generatorLSB block 64 are presented to the group control block 66. The group control block 66 produces the output Ax. The internal logic of the PG generators 60 is described in more detail with respect to FIG. 7, the group PG generators with respect to FIG. 8, the group PG generatorLSB block 64 with respect to FIG. 9 and the group control block 66 with respect to FIG. 10.

The offset block 68 and the offset block 70 each produce an output Pout and are used to select the appropriate size FIFO as described in connection with TABLE 1. It should be appreciated that it is generally more practical in the chip manufacturing art to produce a single size FIFO to accomplish a variety of application needs. If however, a mere single size FIFO is appropriate for a particular design application, the offset block 22, the offset block 68 and the offset block 70 as well as the cumulsize and cumulsizeb inputs 42 and 44 could be eliminated from the flag generator 20.

Figure 3:
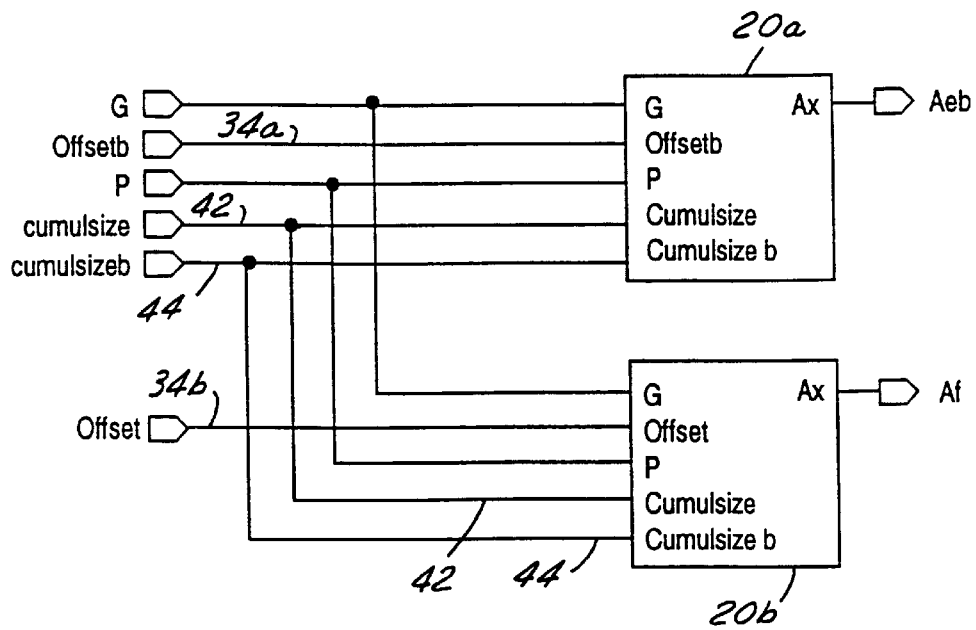
FIG. 3 is a block diagram illustrating the implementation of both an almost empty and almost full flag generator.

Referring to FIG. 3, a block diagram showing the implementation of both an almost empty flag Ae and an almost full flag Af is shown. The implementation is realized by using a first flag generator 20a to generate the almost empty flag Ae and a second flag generator 20b to realize the almost full flag Af. The flag generator 20a has a first offset input 34a that represents a user programmable offset of the almost empty flag Ae. The offset input 34a is a one's complement of the user programmed offset. Accordingly, the almost empty flag Ae is also a complement almost empty flag Aeb. The flag generator 20a also has a generate signal G, a propagate signal P, an input cumulsize input and an input cumulsizeb. The flag generator 20b receives a generate signal G, a propagate signal P, an input cumulsize and an input cumulsizeb. Additionally, the flag generator 20b receives an offset input 34b. The offset input 34b to the flag generator 20b is a true signal, rather than the complement offset input 34a to the flag generator 20a. Since the offset signal is a true signal, the output almost full flag Af is also a true signal.

It should be appreciated from ease in which the almost empty and almost full flags can be generated using an identical flag generator 20a or 20b, with the only change being the offset input 34a and 34b. Since the output of the flag generator 20a is a complement signal, when the almost empty flag Aeb equals zero, the almost empty flag Aeb is active. Conversely when the almost empty flag Aeb equals one, the almost empty flag Aeb is inactive. Since the almost full flag Af is a true signal, when the almost full flag Af equals zero, the almost full flag Af is inactive. Similarly, when the almost full flag Af equals one, the almost full flag Af is active. These active and inactive states would be adjusted accordingly when using either active high or active low logic.

It should be appreciated that the offset input 34a for the external almost empty flag Ae can be any user programmed offset between zero and the size of the FIFO minus one. Similarly the offset input 34b for the almost full flag Af can be any user programmed offset between zero and the size of the FIFO minus one. It should be appreciated that the offset input 34a of the almost empty flag Ae can be a different value than the offset input 34b of the almost full flag Af. With the logic implementation shown in FIG. 2, where fourteen counterbits are used, the counter can count from zero to 16,383 (two to the power 14 minus one). A different number of counter bits could be implemented without departing from the spirit of the present invention.

Figures 4, 5:
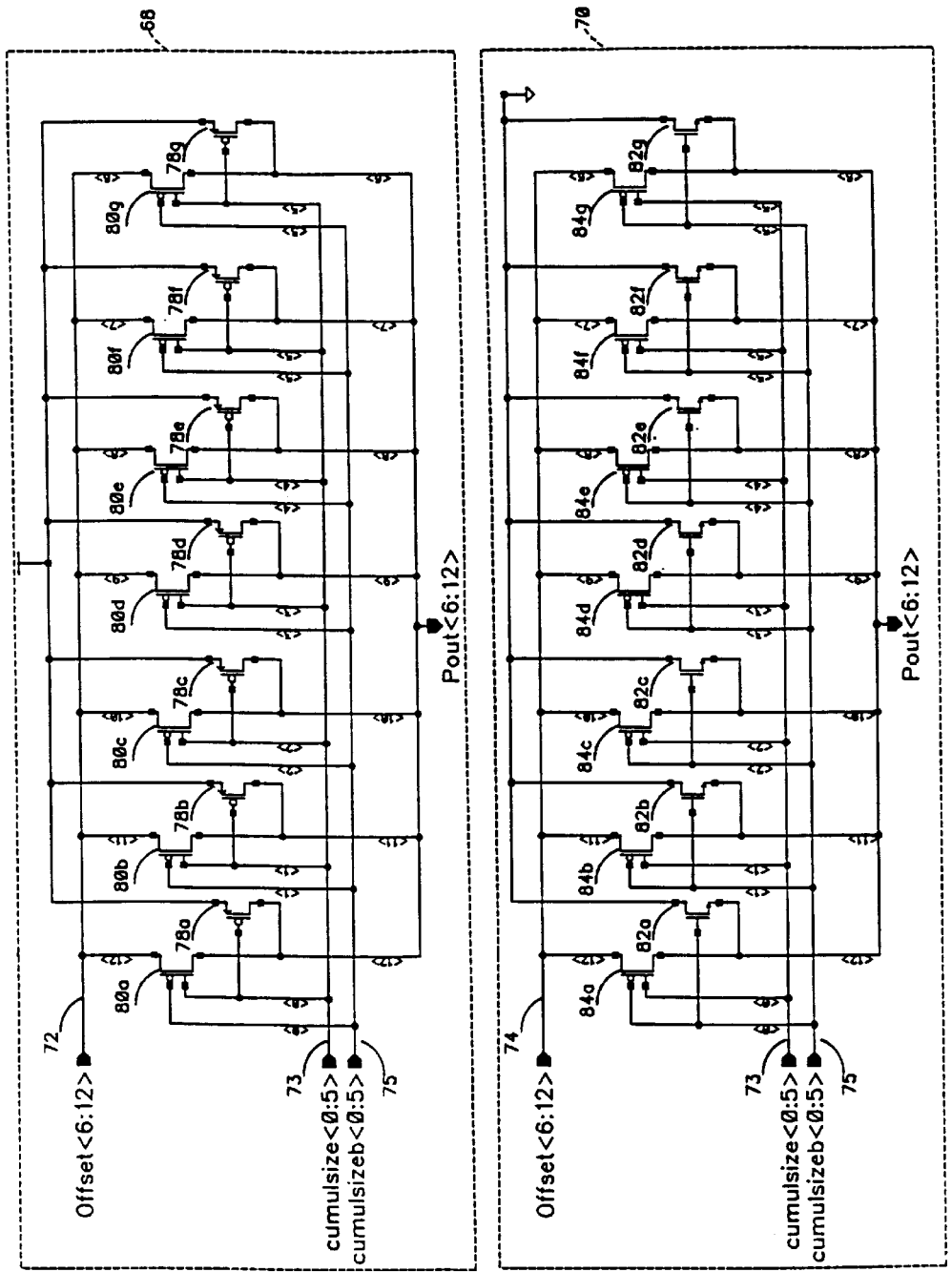
FIG. 4 is a schematic diagram showing the processing of the upper bits of FIG. 1.
FIG. 5 is a schematic diagram showing the processing of the upper bits of the offset input.

Referring to FIG. 4, a schematic diagram of the offset block 68 is shown. As shown in FIG. 2, the offset block 68 has a offset input 72, a cumulsize input 73 and a cumulsizeb input 75. The cumulsize input 73 is presented to the n-gates of a series of CMOS transistors 78a, 78b, 78c, 78d, 78e, 78f and 78g. The cumulsizeb input 75 is presented to a set of p-gates of a series of CMOS transistors 78a, 78b, 78c, 78d, 78e, 78f and 78g. The drains of both the CMOS transistors 78a through 78g and the corresponding CMOS pass gates 80a through 80g are tied together to produce the processed offset output Pout. A similar logic is used to generate the preprocessing block 22. Depending on the depth of the FIFO (refer to Table 1), the most significant offset bits are either passed to the output by the CMOS pass gates 80a–g or the outputs are tied off to the supply by a corresponding pmos gate of the CMOS pass gates 80a–g.

Referring to FIG. 5, a schematic level diagram of the offset block 70 is shown. As shown in FIG. 2, the offset block 70 has an offset input 74, a cumulsize input 73 and a cumulsizeb input 75. The cumulsizeb input is presented to the p-gates of the CMOS pass gates 84a through 84g and the nmos transistors 82a through 82g. The cumulsize input is presented to the n-gates of the CMOS pass gates 84a through 84g. The sources of the n-channel devices 82a through 82g are grounded. The sources of the CMOS pass gates 84a through 84g receive the Offset input 74. The drains of both the n-channel transistors 82a through 82g and the corresponding CMOS pass gates 84a through 84g are tied together and comprise the processed offset output Pout. Depending on the depth of the FIFO (refer to TABLE 1), the most significant offset bits are either passed to the output by the CMOS pass gates or the outputs are grounded by the nmos gates. It should be appreciated that the schematic level transistor implementations shown in FIGS. 4 and 5 are one implementation. Other implementations that produce the same result can be substituted without departing from the spirit of the present invention. Depending on the value of the cumulsize input 73 and cumulsizeb input 75, a number of the CMOS transistors 82 and CMOS pass gates 84 will be unutilized. The determination of which CMOS transistors 82a through 82g and which CMOS pass gates 84a through 84g are utilized is determined by TABLE 1 and the according explanation provided.

Figure 6:
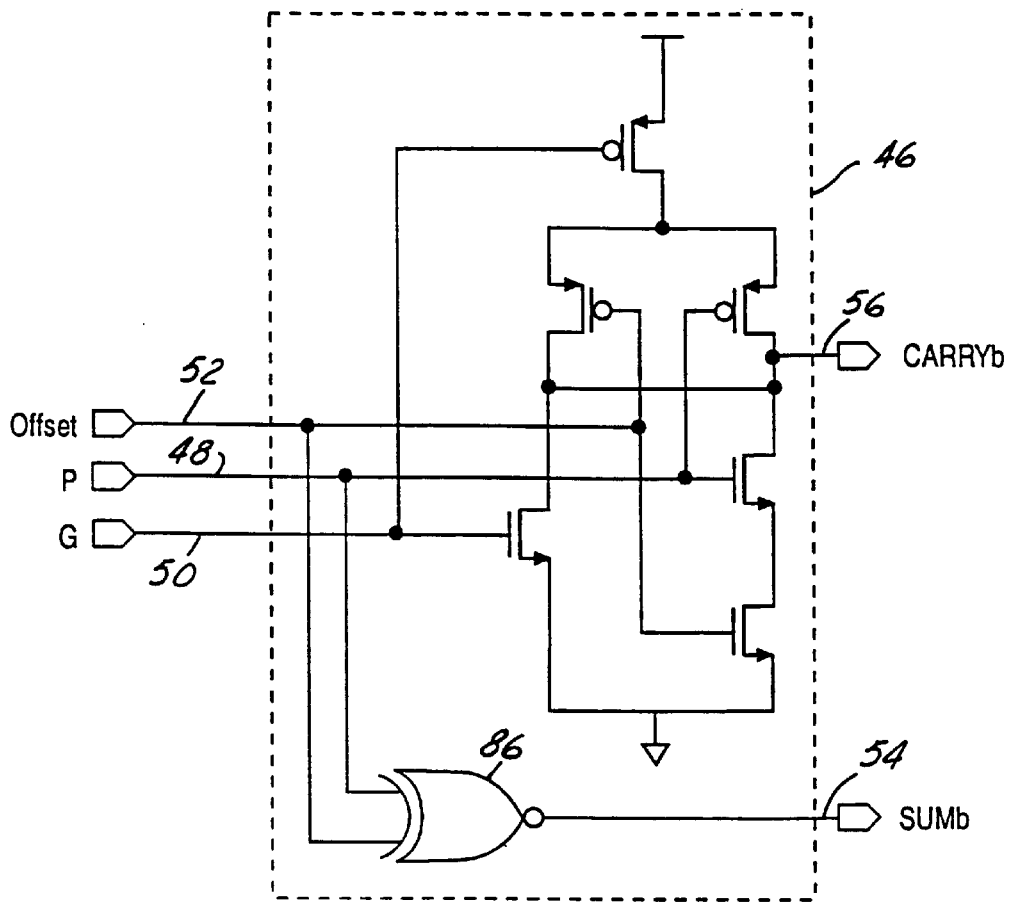
FIG. 6 is a parallel half adder logic.

Referring to FIG. 6, a schematic diagram is shown implementing the carry/sum adders 46. Each of the carry/sum adders 46 receives the first input 48 representing the propagation signal P, the second input 50 representing the generation signal G and the third input 52 representing the user programmed offset. The carry/sum adder 46 produces the output 54 representing the signal SUMb and the output 56 representing the signal CARRYb. An exclusive NOR (XNOR) gate 86 receives an input from the third input 52 and an input from the first input 48 and produces the output 54 representing the signal SUMb. The signal CARRYb is produced by a variety of transistors.

Figure 7:
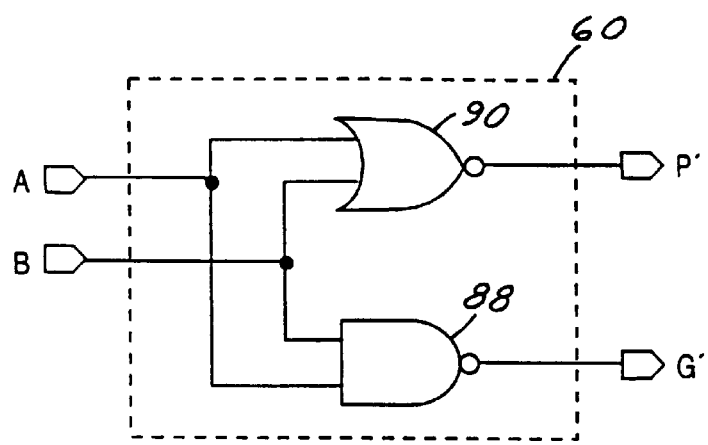
FIG. 7 is a logic diagram used to generate the propagate and generate signals.

Referring to FIG. 7, the PG generator 60 logic is shown. The PG generator 60 receives a first input A and a second input B. The PG generator 60 produces a first output P and a second output G. The PG generator 60 comprises a NAND gate 88 and a NOR gate 90. The NAND gate 88 receives a first input from the input A and a second input from the input B and presents the output P. Similarly, the NOR gate 90 receives a first input B and a second input A and presents the propagation signal G.

Figure 8:
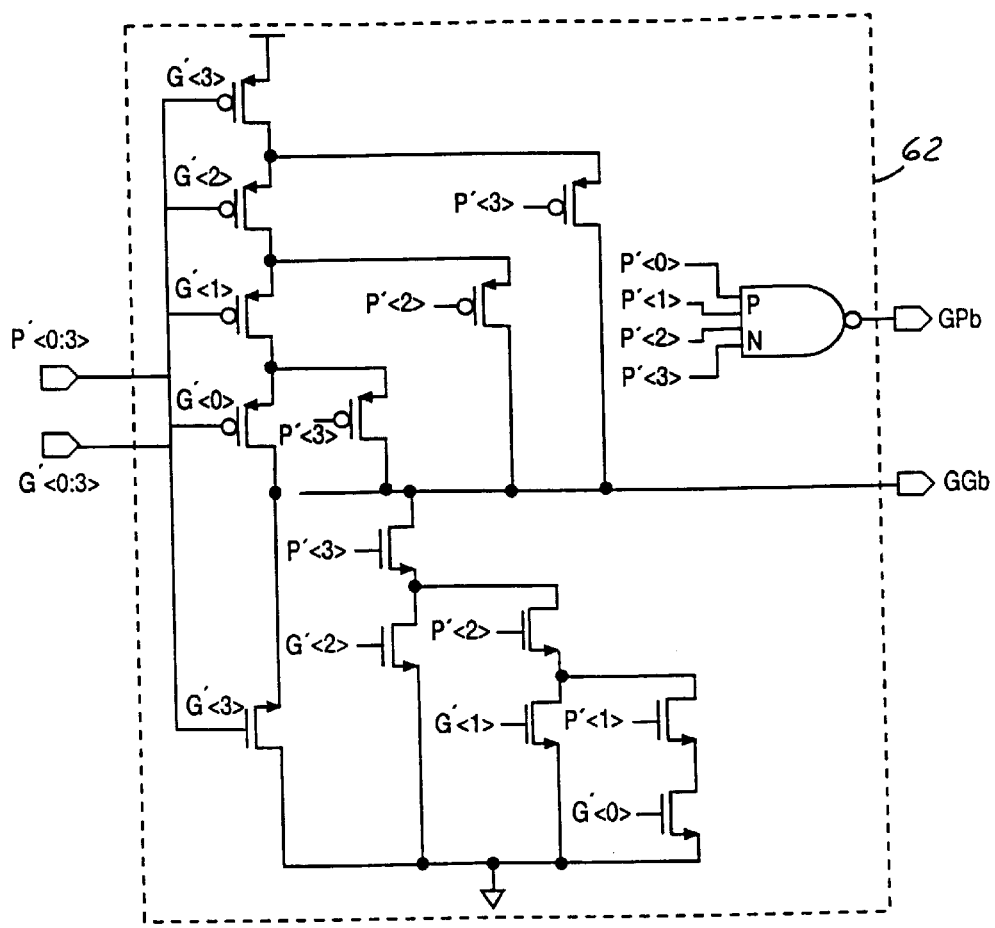
FIG. 8 is a schematic diagram of the group propagate and generate signals.

Referring to FIG. 8, the group PG generator 62 is shown having a first propagation input P and a second generation input G. The group PG generator 62 presents an output GGb. The group PG generator 62 comprises an array of transistors to implement this function.

Figure 9:
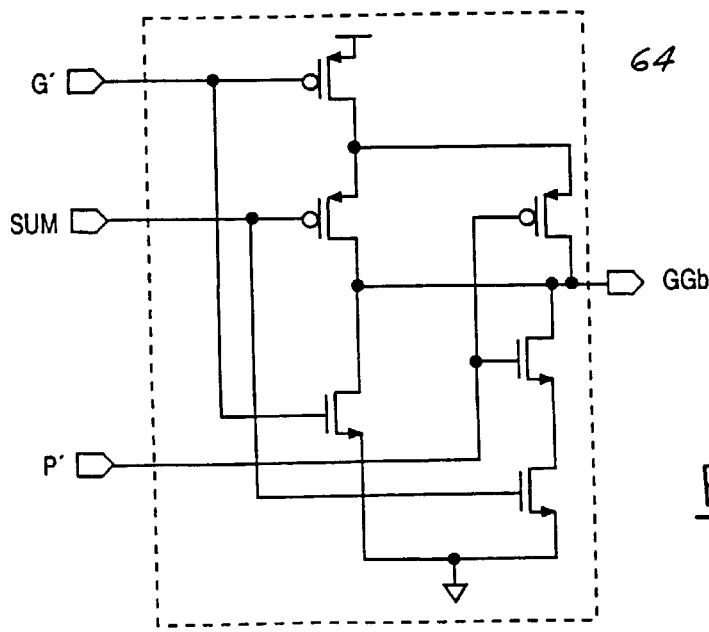
FIG. 9 is a least significant bit logic diagram.

Referring to FIG. 9, the group PG generatorLSB block 64 is shown having a first generation input G, a second input SUM and a third propagation input P. The group PG generatorLSB block 64 presents an output GGb. The group PG generatorLSB block 64 comprises an array of transistors to implement this function.

Figure 10:
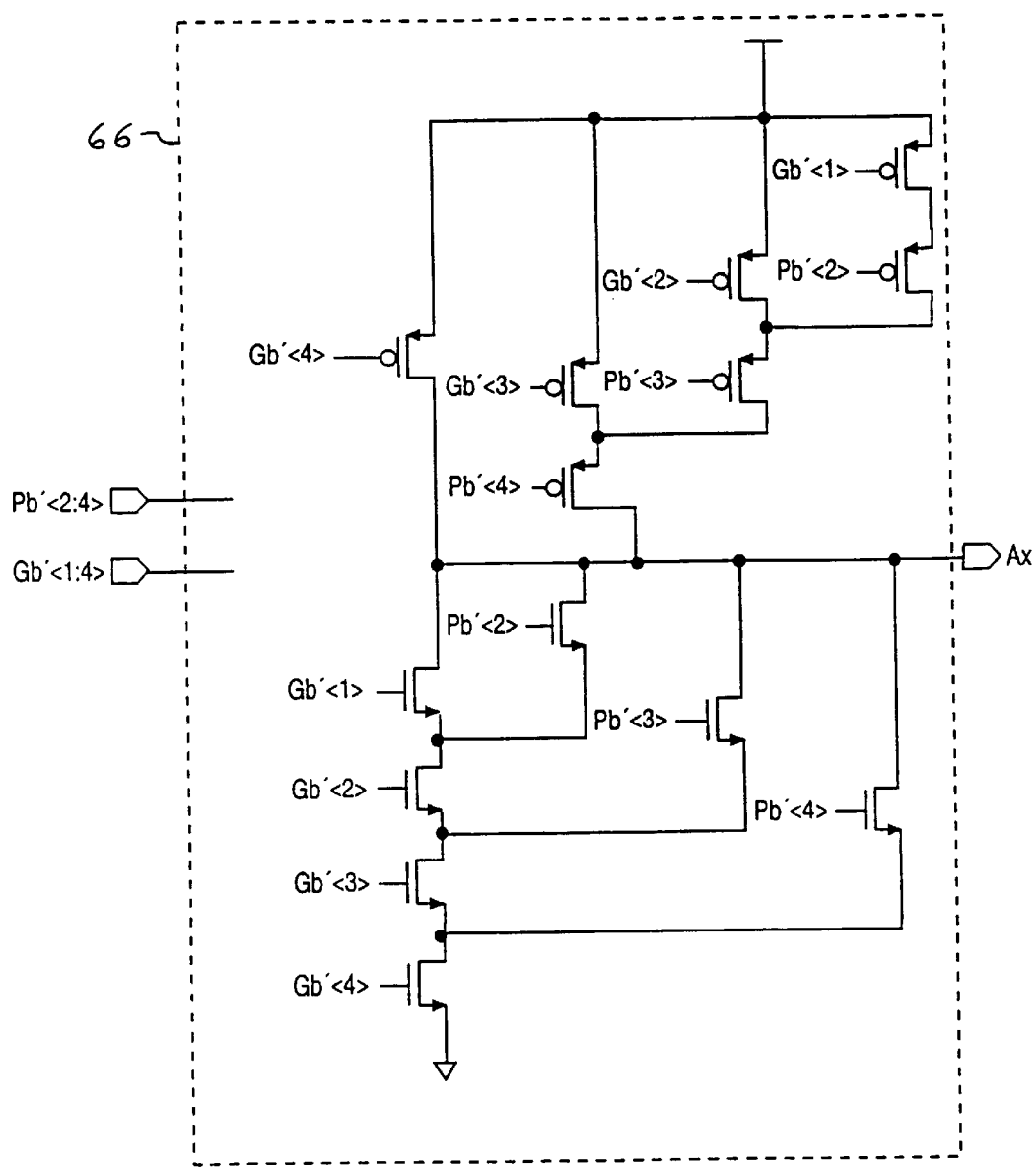
FIG. 10 is a schematic diagram illustrating the generation of the final single bit output Ax.

Referring to FIG. 10, group control block 66 is shown having a first propagation complement input Pb and a second generation complement input Gb. The group control block 66 presents an output flag Ax that represents either an almost empty flag Ae or an almost full flag Af. The group control block 66 comprises an array of transistors to implement this function. The group control block 66 represents the final flag generation logic.

One implementation of the present invention, as illustrated in FIG. 3, allows for generation of both an almost empty flag Ae as well as an almost full flag Af. The implementation allows for a user programmed offset input 34a to indicate the level of fullness of the FIFO when the almost empty flag Ae is generated. Similarly, the almost full flag Af has an offset input 34b that indicates the level of fullness of the FIFO when the almost full flag Af is present. The flag generators 20a and 20b each receive a cumulsize input 42 and a cumulsizeb input 44 that allow for the programming of the size of the FIFO to match the design requirements of a particular application. The offset input 34a of the almost empty flag Ae can be programmed independently from the offset 34b of the almost full flag Af. The present invention allows this independent programming of the empty and full offsets while maintaining a generation delay significantly less than the prior art. Specifically, prior art techniques used to generate an almost empty flag Ae and an almost full flag Af have delays in the magnitude of 30 ns or more. The present invention realizes flag generation delays of 12 ns or less.

It is to be understood that modifications to the invention might occur to one with skill in the field of the invention within the scope of the appended claims.

What is claimed is:

1. A circuit comprising:
   an adder circuit configured to generate a sum output and a carry output in response to (i) a read count signal and (ii) a write count signal; and
   a generator circuit configured to generate a flag in response to (i) said sum output and (ii) said carry output, wherein said flag is at a first logic state when a FIFO is almost full and is at a second logic state when said FIFO is not almost full.

2. The circuit according to claim 1, further comprising:
   a plurality of carry/sum adders each having a first input receiving said read count signal, a second input receiving said write count signal and a third input receiving an offset signal indicating the level of fullness of said FIFO when said flag is at said first logic state, each of said carry/sum adders having a carry output and a sum output, wherein said carry output of a most significant carry/sum adder is discarded.

3. The circuit according to claim 2 wherein said generator circuit further comprises a plurality of first generators each having (i) a first input coupled to said carry output of one of said plurality of carry/sum adders and (ii) a second input coupled to a carry output of another one of said carry/sum adders, wherein each of said first generators has a first output representing a propagate signal and a second output representing a generate signal.

4. The circuit according to claim 3 wherein said generator circuit further comprises a plurality of second generators each having (i) a first input coupled to each of said propagate signals from said first generators and (ii) a second input coupled to each of said generate signals from said first generators, wherein each of said second generators has a first output representing a group propagate signal and a second output representing a group generate signal.

5. The circuit according to claim 4 wherein said generator circuit further comprises a group control generator having (i) a first input coupled to each of said group propagate signals from said second generators and (ii) a second input coupled to each of said group generate signals from said second generators, wherein said group control generator generates an output representing said flag.

6. The circuit according to claim 1 wherein said adder circuit further comprises a third input receiving said offset signal indicating the level of fullness of said FIFO when said flag is at said first logic state.

7. The circuit according to claim 6 wherein said adder circuit comprises a plurality of carry/sum adders each having a first input receiving said read count signal, a second input receiving said write count signal and a third input receiving said offset signal, each of said carry/sum adders having a carry output and a sum output, said carry output of a most significant carry/sum adder is discarded.

8. The circuit according to claim 1 wherein said flag is at a first logic state when said FIFO is almost empty and is at said second logic state when said FIFO is not almost empty.

9. The circuit according to claim 1 wherein said adder circuit further receives program information to program a number of memory cells in the FIFO buffer to be at a first active state or a second inactive state.

10. The circuit according to claim 9 wherein said number of cells in said FIFO is programmable in response to said program information.

11. A method for generating a flag indicating the fullness of a FIFO buffer comprising the steps of:
   (a) generating a first output and a second output in response to (i) a read count signal, (ii) a write count signal and (iii) an offset signal indicating the level of fullness of a FIFO; and
   (b) generating said flag in response to (i) said first output and (ii) said second output, said flag is at a first logic state when said FIFO is almost full and is at a second logic state when said FIFO is not almost full.

12. The method according to claim 11, further comprising the step of:
   (c) generating a plurality of carry/sum outputs in response to (i) said read count signal, (ii) said write count signal and (iii) said offset signal, wherein a most significant carry/adder is discarded.

13. The method according to claim 11 wherein said flag is at a first logic state when said FIFO is almost empty and is at another logic state when said FIFO is not almost empty.

14. The method according to claim 11, further comprising the step of:
   (d) programming a number of memory cells in the FIFO to be at a first active state or a second inactive state.

15. A circuit comprising:
   an adder circuit configured to generate a sum output and a carry output in response to (i) a read count signal and (ii) a write count signal; and
   a generator circuit configured to generate a flag in response to (i) said sum output, (ii) said carry output and (iii) an offset signal, wherein said flag is at a first logic state when a FIFO is almost full and is at a second logic state when said FIFO is not almost full.

16. The circuit according to claim 15, wherein said offset signal indicates a level of fullness of said FIFO when said flag is at said first logic state.

* * * * *